(12) United States Patent
Yang et al.

(10) Patent No.: US 7,051,522 B2
(45) Date of Patent: May 30, 2006

(54) THERMOELECTRIC CATALYTIC CONVERTER TEMPERATURE CONTROL

(75) Inventors: Jihui Yang, Lakeshore (CA); Mei Cai, Bloomfield Hills, MI (US); Francis R. Stabler, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/861,326

(22) Filed: Jun. 4, 2004

(65) Prior Publication Data

US 2005/0268598 A1 Dec. 8, 2005

(51) Int. Cl.
*F01N 3/02* (2006.01)

(52) U.S. Cl. .......................... 60/320; 60/274; 60/298; 60/299; 60/287; 422/109; 422/174; 422/199; 422/202

(58) Field of Classification Search .................. 60/274, 60/275, 298, 299, 320, 287; 422/109, 173, 422/174, 180, 198, 199, 202
See application file for complete search history.

(56) References Cited

U.S. PATENT DOCUMENTS

| | | | | | |
|---|---|---|---|---|---|
| 3,217,696 | A | * | 11/1965 | Kiekhaefer | ..................... 123/2 |
| 4,097,752 | A | * | 6/1978 | Wulf et al. | ................... 290/20 |
| 4,753,682 | A | * | 6/1988 | Cantoni | ...................... 136/212 |
| 5,033,264 | A | * | 7/1991 | Cabral | ......................... 60/274 |
| 5,625,245 | A | * | 4/1997 | Bass | ......................... 310/306 |
| 5,968,456 | A | * | 10/1999 | Parise | ......................... 422/174 |
| 2003/0223919 | A1 | * | 12/2003 | Kwak et al. | ................ 422/174 |

* cited by examiner

*Primary Examiner*—Tu M. Nguyen
(74) *Attorney, Agent, or Firm*—Kathryn A. Marra

(57) ABSTRACT

A method for controlling temperature of a catalytic converter in an automobile exhaust system is disclosed. The method includes establishing a reference temperature for the catalytic converter, distributing a stream of exhaust gases through the catalytic converter, obtaining a measured temperature of the catalytic converter and converting thermal energy from the stream of exhaust gases into electrical energy when the measured temperature exceeds the reference temperature. An apparatus for controlling temperature of a catalytic converter in an automobile exhaust system is also disclosed.

14 Claims, 2 Drawing Sheets

THERMOELECTRIC CATALYTIC CONVERTER TEMPERATURE CONTROL

FIELD OF THE INVENTION

The present invention relates to catalytic converters used in automobile exhaust systems to treat unburned hydrocarbons, carbon monoxide and various nitrogen oxides in an exhaust stream. More particularly, the present invention relates to a method and apparatus for thermoelectrically capturing thermal energy from an exhaust stream in an automobile exhaust system to control the temperature and prolong the lifetime of a catalytic converter in the system, which would lead to significant cost reduction.

BACKGROUND OF THE INVENTION

Automotive vehicles have used catalytic converters to treat unburned hydrocarbons, carbon monoxide and various nitrogen oxides produced from the combustion of hydrocarbon fuels in the engine. The engine exhaust gases flow through a catalytic converter that contains a very small quantity of noble metal catalysts such as palladium, platinum and rhodium coated on the surface of ceramic substrate inside the catalytic converter. The hydrocarbon and oxide constituents are oxidized and/or reduced by these catalysts.

A challenge often encountered in preparing exhaust treatment catalysts for catalytic converters lies in making the most efficient use of the relatively expensive noble metals. The noble metals must be distributed in the catalytic converter in such a manner that all of the metal is exposed to exhaust gas flowing through the converter. Due to heat and vibration, the precious noble metal particles have a tendency to agglomerate and grow over time to form larger crystalline particles with reduced conversion efficiency. Thus, it is necessary to incorporate a sufficient excess quantity of the noble metals onto the surface of ceramic substrate inside the catalytic converter to ensure continuous catalytic activity over the lifetime of the vehicle.

The cost of emission control systems could be reduced if the optimum dispersion of platinum group metals (PGM) nanoparticles can be achieved. It is also important to maintain optimum dispersion of the noble metals on the surface of ceramic substrate inside catalytic converter surfaces over time. For automotive applications, it would be much easier to maintain optimum dispersion of the PGM nanoparticles over the vehicle lifetime if the temperature of catalytic converters can be controlled to within a maximum temperature range of typically about 500~650 degrees C. This requires the use of additional mechanisms to control the maximum converter temperature, which can reach temperatures of up to 1,000 degrees C. under some operating conditions if not controlled.

Accordingly, a method and apparatus are needed to maintain the temperature of a catalytic converter within an optimal temperature range in order to prolong the lifetime of the catalytic converter, which would lead to significant cost reduction.

SUMMARY OF THE INVENTION

The present invention is generally directed to a novel method for maintaining the temperature of a catalytic converter in an automobile exhaust system within an optimal temperature range to prevent overheating and prolong the lifetime of the catalytic converter, which would lead to significant cost reduction. In one embodiment, the method includes providing alternate exhaust flow pathways for exhaust gases generated by an internal combustion engine; providing a thermoelectric energy recovery system (ERS) in one of the exhaust flow pathways; providing a main exhaust flow pathway for receiving exhaust gas from the alternate exhaust flow pathways; and providing a catalytic converter in the main exhaust flow pathway. When the temperature of the catalytic converter is low, the exhaust gas is initially distributed through the alternate exhaust flow pathway without the ERS until the catalytic converter reaches a preset reference temperature. At that point, the exhaust gas is distributed through the alternate exhaust flow pathway having the ERS to convert most of the exhaust heat energy into electrical energy and prevent over-heating of the catalytic converter.

In another embodiment, the method includes providing a main exhaust flow pathway having a catalytic converter and providing at least one thermoelectric energy recovery system (ERS) in thermally-conductive relationship to the catalytic converter. Under exhaust system operation, the ERS must be cooled with a coolant to facilitate proper thermal-to-electrical conversion functioning. At low converter temperatures, the flow of coolant to the ERS is terminated to prevent functioning of the ERS and cause the temperature of the catalytic converter to rise rapidly. After the temperature of the catalytic converter reaches a preset reference temperature, flow of coolant to the ERS is resumed to resume functioning of the ERS and convert most of the exhaust heat into electrical energy.

The present invention is further directed to an apparatus for thermoelectrically capturing thermal energy from an exhaust stream in an automobile exhaust system to control the temperature and prolong the lifetime of a catalytic converter in the system, which would lead to significant cost reduction. In one embodiment, the apparatus includes an exhaust outlet conduit which receives exhaust gases from an automobile engine. A thermoelectric ERS conduit, in which is provided a thermoelectric ERS (energy recovery system), and an ERS bypass conduit branch from the exhaust outlet conduit. The thermoelectric ERS conduit and the ERS bypass conduit merge into a main exhaust flow conduit, in which is provided a catalytic converter. During operation of the automobile, exhaust gases initially flow through the ERS bypass conduit to the catalytic converter until the catalytic converter reaches a preset reference temperature. At that point, the exhaust gases are diverted from the ERS bypass conduit through the thermoelectric ERS in the thermoelectric ERS conduit such that most of the exhaust heat energy is converted into electrical energy. This maintains the catalytic converter within an optimum temperature range to prevent overheating and prolong the lifetime of the catalytic converter, which would lead to significant cost reduction. A battery in the automobile may be connected to the thermoelectric ERS to store the converted electrical energy for operation of automobile components.

In another embodiment of the invention, the apparatus for thermoelectrically capturing thermal energy from an exhaust stream in an automobile exhaust system includes an exhaust outlet conduit which receives exhaust gases from an internal combustion engine in an automobile. A catalytic converter is provided in the exhaust outlet conduit, and at least one thermoelectric ERS is provided in thermal contact with the catalytic converter. A coolant flow circuit is provided to distribute a coolant through the thermoelectric ERS for proper functioning of the ERS. During operation of the automobile, exhaust gases flow through the exhaust outlet conduit and through the catalytic converter. At low temperatures of the catalytic converter, flow of coolant is diverted from the ERS such that the ERS does not function and the temperature of the catalytic converter rises rapidly. As the temperature of the catalytic converter rises to a preset reference temperature, coolant is distributed through the ERS such that the ERS resumes functioning and most of the exhaust heat energy is converted into electrical energy. This maintains the temperature of the catalytic converter within an optimal temperature range. A battery in the automobile may be connected to the thermoelectric ERS to store the converted electrical energy for operation of automobile components.

BRIEF DESCRIPTION OF THE DRAWINGS

The invention will now be described, by way of example, with reference to the accompanying drawings, in which.

DETAILED DESCRIPTION OF THE INVENTION

Figure 1:
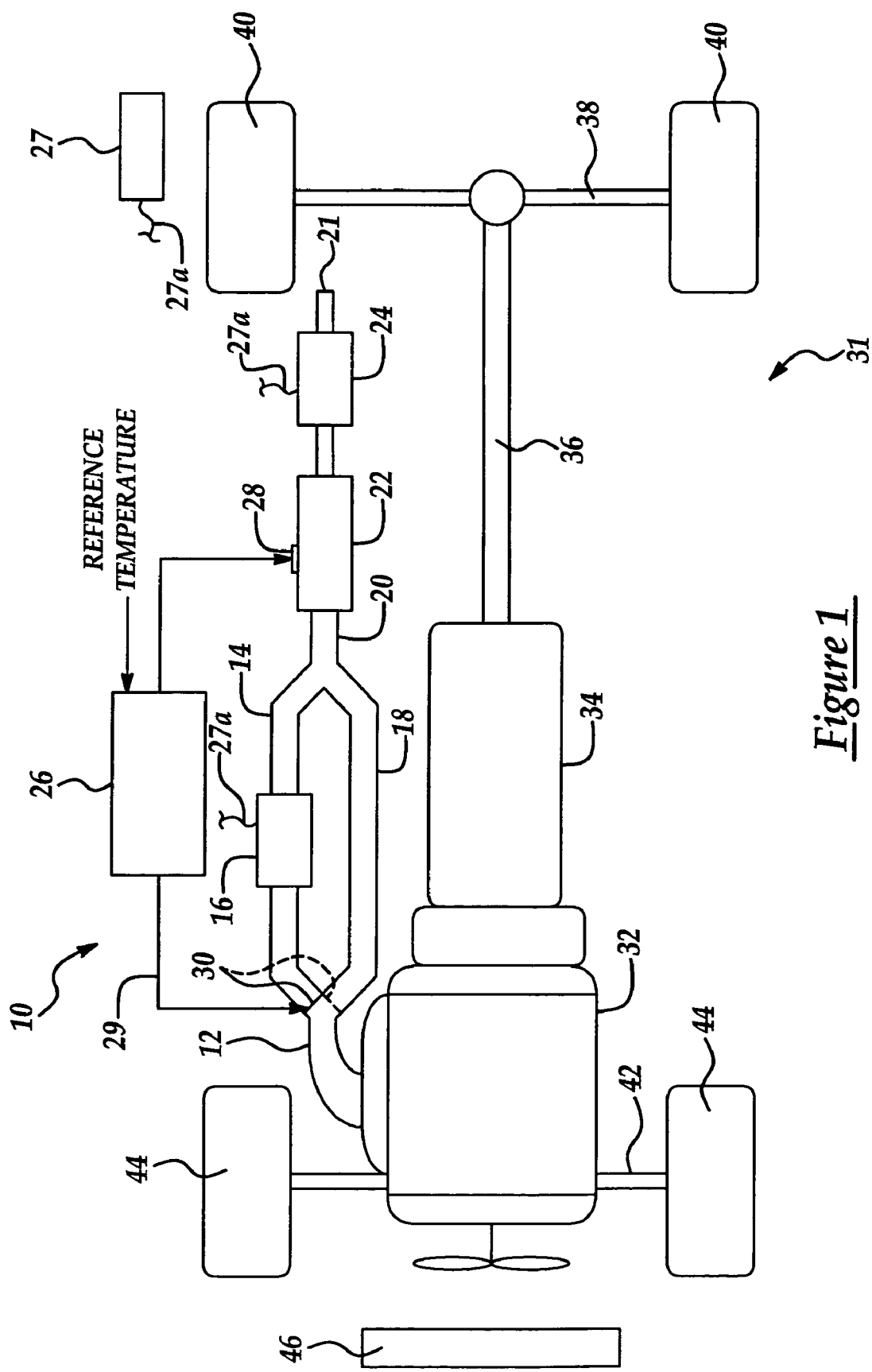
FIG. 1 is a schematic view of an automobile which incorporates a thermoelectric catalytic converter temperature control apparatus according to a first embodiment of the present invention.

Referring initially to FIG. 1, an illustrative embodiment of the apparatus for thermoelectrically capturing thermal energy from an exhaust stream in an automobile exhaust system, hereinafter apparatus, of the present invention is generally indicated by reference numeral 10. The apparatus 10 is shown in FIG. 1 as being a part of an automobile 31 having an internal combustion engine 32, a transmission 34 and a drive shaft 36 which transmit rotation from the engine 32 to rear wheels 40 mounted on a rear axle 38. A front axle 42 mounts a pair of front wheels 44. A radiator 46 is provided for cooling the engine 32, in conventional fashion. However, it is understood that the automobile 31 is just one example of an automobile which is suitable for implementation of the present invention. Accordingly, the invention is equally adaptable to front-wheel drive automobiles and automobiles having a drive and radiator configuration which varies from that shown in FIG. 1.

The apparatus 10 includes an exhaust outlet conduit 12 which receives exhaust gases from the engine 32 during operation of the automobile 31. An ERS conduit 14 and an ERS bypass conduit 18 branch from the exhaust outlet conduit 12. A thermoelectric ERS (energy recovery system) 16, which may be conventional, is provided in the ERS conduit 14 for converting exhaust heat energy from the exhaust gases into electrical energy, as will be hereinafter described. An onboard vehicle battery 27 may be connected to the thermoelectric ERS 16, typically through wiring 27a, to store electrical energy generated by the thermoelectric ERS 16.

The ERS conduit 14 and ERS bypass conduit 18 merge into a main exhaust flow conduit 20. A catalytic converter 22, which may be conventional, is provided in the main exhaust flow conduit 20. A thermoelectric ERS 24 may be provided in the main exhaust flow conduit 20, downstream of the catalytic converter 22. Like the thermoelectric ERS 16, the thermoelectric ERS 24 may be connected to the onboard vehicle battery 27, typically through wiring 27a, for the storage of electrical energy generated by the thermoelectric ERS 24.

An actuator plate 30 is provided in the exhaust outlet conduit 12, at the inlet of the ERS conduit 14 and of the ERS bypass conduit 18. The actuator plate 30 is capable of being positioned in such a manner as to block the inlet of the ERS conduit 14, as shown by the solid lines, or alternatively, to block the inlet of the ERS bypass conduit 18, as indicated by the phantom lines. A controller 26 operably engages an actuator 29, which in turn, operably engages the actuator plate 30 to selectively block the inlet of the ERS conduit 14 or the ERS bypass conduit 18. A temperature sensor 28 is provided in thermal contact with the catalytic converter 22. The temperature sensor 28 is further operably connected to the controller 26 to transmit temperature signals to the controller 26 during operation of the vehicle 31. Accordingly, depending on the temperature of the catalytic converter 22 as measured by the temperature sensor 28, the controller 26 causes the actuator 29 to position the actuator plate 30 in such a manner that exhaust gases flow through either the ERS conduit 14 or the ERS bypass conduit 18, as will be hereinafter further described. It is understood that the actuator plate 30 represents one possible mechanism for alternately blocking the flow of exhaust gases through the ERS conduit 14 and the ERS bypass conduit 18 and that alternative mechanisms known by those skilled in the art may be used for the purpose.

Typical operation of the apparatus 10 is as follows. A reference temperature, such as about 500~650 degrees C., for example, is initially programmed into the controller 26. The reference temperature corresponds to the maximum temperature desired for the catalytic converter 22 during operation of the automobile 31. After initial start-up of the automobile 31, exhaust gases flow from the engine 32 into the exhaust outlet conduit 12. Initially, due to the relatively low temperature of the catalytic converter 22 as measured by the temperature sensor 28, the controller 26 causes the actuator 29 to position the actuator plate 30 in the exhaust outlet conduit 12 in such a manner that the actuator plate 30 blocks the inlet of the ERS conduit 14. Accordingly, the exhaust gases flow through the ERS bypass conduit 18, bypassing the thermoelectric ERS 16. The exhaust gases flow from the ERS bypass conduit 18 and into the main exhaust flow conduit 20; through the catalytic converter 22 and thermoelectric ERS 24, respectively; and are discharged from the discharge end 21 of the main exhaust flow conduit 20.

After the automobile 31 has been operating for a period of typically several minutes, the temperature of the catalytic converter 22 rises substantially due to the continual flow of the exhaust gases through the catalytic converter 22. Eventually, the temperature of the catalytic converter 22 reaches the preset reference temperature programmed into the controller 26. Accordingly, the temperature sensor 28 relays this information, in the form of a temperature data signal, to the controller 26, which causes the actuator 29 to change the position of the actuator plate 30 from the position indicated by the solid lines to the position indicated by the phantom lines. Therefore, the actuator plate 30 uncovers the inlet of the ERS conduit 14 and blocks the inlet of the ERS bypass conduit 18. This facilitates flow of the exhaust gases from the exhaust outlet conduit 12 and through the ERS conduit 14 and thermoelectric ERS 16. The thermoelectric ERS 16 converts most of the thermal energy from the exhaust gases into electrical energy. The electrical energy generated by the thermoelectric ERS 16 is typically transmitted to the onboard vehicle battery 27, which stores the electrical energy for the powering of various components in the automobile 31.

After it flows through the thermoelectric ERS 16, the exhaust gases flow from the ERS conduit 14 and into the main exhaust flow conduit 20; through the catalytic converter 22 and thermoelectric ERS 24, respectively; and out the discharge end 21 of the main exhaust flow conduit 20. Because the thermoelectric ERS 16 converts most of the thermal energy of the flowing exhaust gases into electrical energy, the temperature of the exhaust gases as the gases subsequently flow through the catalytic converter 22 is substantially reduced. Consequently, the temperature of the catalytic converter 22 eventually drops below the preset reference temperature programmed into the controller 26. At that point, the controller 26, upon receiving temperature data input from the temperature sensor 28, causes the actuator 29 to re-position the actuator plate 30 from the position indicated by the dashed lines (wherein the actuator plate 30 blocks the inlet of the ERS bypass conduit 18) to the position indicated by the solid lines (wherein the actuator plate 30 blocks the inlet of the ERS conduit 14). Accordingly, the exhaust gases again flow through the ERS bypass conduit 18, thereby bypassing the thermoelectric ERS 16 such that the temperature of the catalytic converter 22 again rises to the preset temperature. At that point, the controller 26 again re-positions the actuator plate 30 to block the ERS bypass conduit 18 and allow flow of the exhaust gases through the thermoelectric ERS 16, reducing the temperature of the exhaust gases prior to flow of the gases through the catalytic converter 22.

Throughout operation of the automobile 31, the foregoing cycle continues to maintain the temperature of the catalytic converter 22 at or as close as possible to the reference temperature. This prevents the temperature of the catalytic converter 22 from rising to temperatures at which agglomeration of catalysts in the catalytic converter 22 tends to occur. Accordingly, the lifetime of the catalytic converter 22 is substantially prolonged. Furthermore, the thermoelectric ERS 16 and thermoelectric ERS 24 provide an additional source of electricity for the onboard vehicle battery 27.

Figure 2:
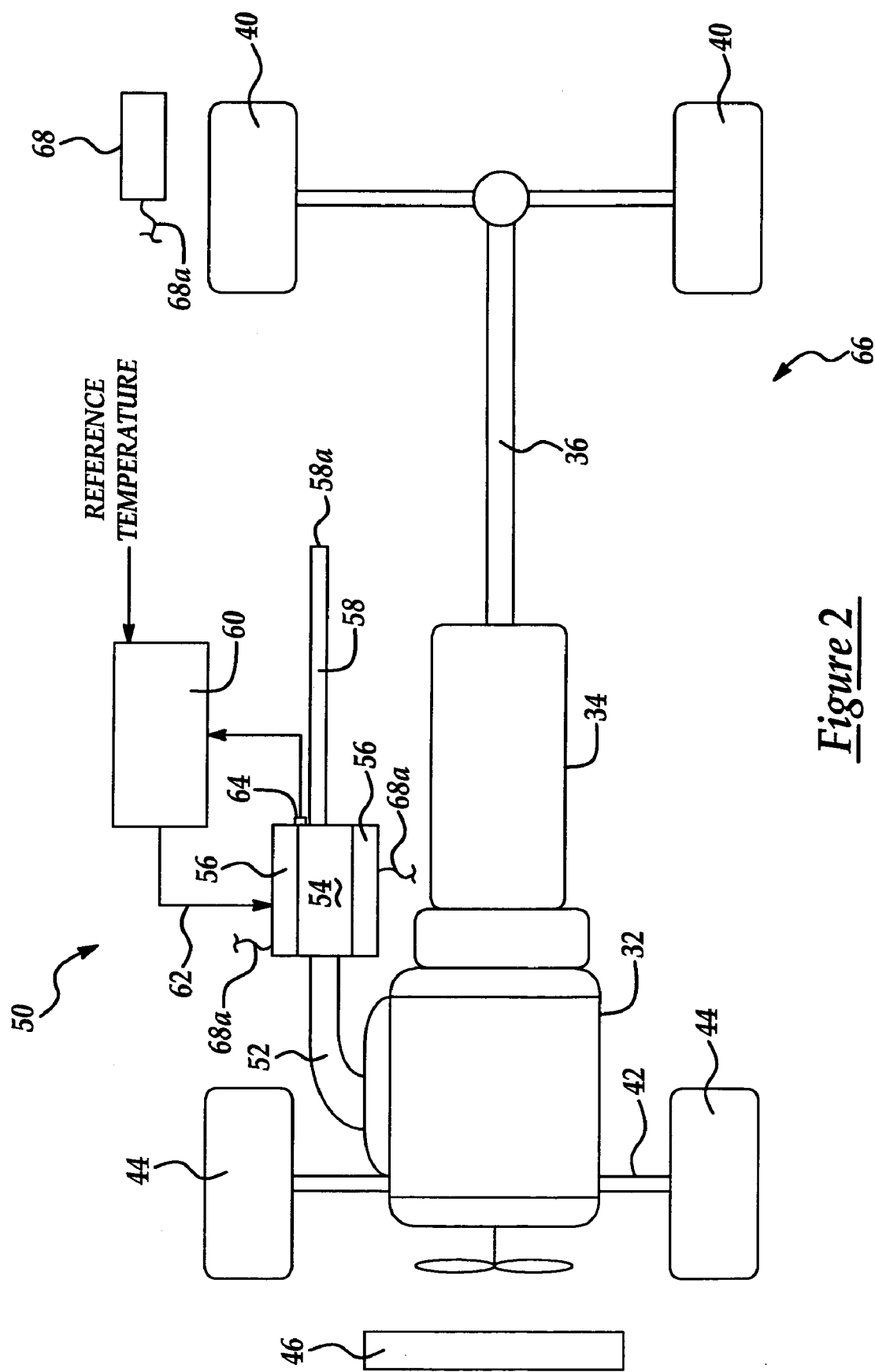
FIG. 2 is a schematic view of an automobile which incorporates a thermoelectric catalytic converter temperature control apparatus according to a second embodiment of the present invention.

Referring next to FIG. 2, another illustrative embodiment of the apparatus for thermoelectrically capturing thermal energy from an exhaust stream in an automobile exhaust system, hereinafter apparatus, of the present invention is generally indicated by reference numeral 50. The apparatus 50 is shown in FIG. 2 as being a part of an automobile 66 having a rear-wheel drive mechanism. However, it will be appreciated that the invention is equally adaptable to front-wheel drive automobiles and automobiles having a drive and radiator configuration which varies from that shown in FIG. 2.

The apparatus 50 typically includes an exhaust outlet conduit 52 which extends from the internal combustion engine 32 of the automobile 66. A catalytic converter 54, which may be conventional, is provided in the exhaust outlet conduit 52. At least one thermoelectric ERS 56 is provided in thermal contact with the catalytic converter 54. Preferably, a pair of thermoelectric ERS 56 is provided in thermal contact with the catalytic converter 54. Accordingly, the catalytic converter 54 may be sandwiched between the thermoelectric ERS 56, as shown in FIG. 2. Each thermoelectric ERS 56 includes a coolant system (not shown) through which a coolant (not shown) is distributed for proper functioning of the thermoelectric ERS 56. Each thermoelectric ERS 56 may be connected, typically through wiring 68a, to an onboard vehicle battery 68 for the storage of electrical energy generated by the thermoelectric ERS 56. A main exhaust flow conduit 58, having a discharge end 58a, extends from the outlet of the catalytic converter 54.

A controller 60 operably engages an actuator 62, which in turn operably engages the coolant system (not shown) of each thermoelectric ERS 56, according to the knowledge of those skilled in the art. A temperature sensor 64 is provided in thermal contact with the catalytic converter 54 to measure the temperature of the catalytic converter 54. The temperature sensor 64 is operably connected to the controller 60 and relays a temperature data signal which indicates the temperature of the catalytic converter 54 to the controller 60. Accordingly, depending on the temperature of the catalytic converter 54 as measured by the temperature sensor 64, the controller 60 either actuates or terminates operation of each thermoelectric ERS 56 through the coolant system of each, as will be hereinafter further described.

Typical operation of the apparatus 50 is as follows. A reference temperature, which corresponds to the maximum temperature desired for the catalytic converter 54 during operation of the automobile 66, is initially programmed into the controller 60. The reference temperature is typically about 500–650 degrees C. After initial start-up of the automobile 66, exhaust gases flow from the engine 32 into the exhaust outlet conduit 52; through the catalytic converter 54 and main exhaust flow conduit 58; and from the discharge end 58a thereof, respectively. Initially, the temperature of the catalytic converter 54 as measured by the temperature sensor 64 is relatively low. Therefore, the controller 60 causes the actuator 62 to terminate flow of coolant at the cool side of each thermoelectric ERS 56. This prevents each thermoelectric ERS 56 from converting thermal energy of the exhaust gases into electrical energy, and therefore, facilitates heating of the catalytic converter 54.

After the automobile 66 has been operating for a period of typically several minutes, the temperature of the catalytic converter 54 rises substantially due to the continual flow of the exhaust gases through the catalytic converter 54. Eventually, the temperature of the catalytic converter 54 reaches the preset reference temperature programmed into the controller 60. Accordingly, the temperature sensor 64 relays this information, in the form of a temperature data signal, to the controller 60. In turn, the controller 60 causes the actuator 62 to resume flow of coolant at the cool side of each thermoelectric ERS 56. This causes each thermoelectric ERS 56 to convert thermal energy from the flowing exhaust gases into electrical energy, which is typically stored in the onboard vehicle battery 68. Therefore, the temperature of the exhaust gases flowing through the catalytic converter 54 is reduced, causing a corresponding reduction in the temperature of the catalytic converter 54 below the reference temperature. At that point, the controller 60, responsive to a temperature input signal from the temperature sensor 64, causes the actuator 62 to terminate further flow of coolant at the cool side of each thermoelectric ERS 56. Therefore, each thermoelectric ERS 56 no longer converts thermal energy from the exhaust gases into electrical energy. Consequently, the temperature of each thermoelectric ERS 56 again increases to the reference temperature, at which point the controller 60 resumes operation of each thermoelectric ERS 56, and the cycle is repeated to maintain the temperature of the catalytic converter 54 as close as possible to the reference temperature.

While the preferred embodiments of the invention have been described above, it will be recognized and understood that various modifications can be made in the invention and the appended claims are intended to cover all such modifications which may fall within the spirit and scope of the invention.

The invention claimed is:

1. A method for controlling temperature of a catalytic converter in an automobile exhaust system, comprising:
   establishing a reference temperature for said catalytic converter;
   distributing a stream of exhaust gases through said catalytic converter;
   obtaining a measured temperature of said catalytic converter;
   converting thermal energy from said stream of exhaust gases into electrical energy when said measured temperature exceeds said reference temperature;
   retaining said thermal energy in said stream of exhaust gases when said measured temperature falls below said reference temperature; and
   providing first and second exhaust flow pathways for said stream of exhaust gases and wherein said converting thermal energy from said stream of exhaust gases into electrical energy comprises distributing said stream of exhaust gases through said first exhaust flow pathway and said retaining said thermal energy in said stream of exhaust gases comprises distributing said stream of exhaust gases through said second exhaust flow pathway.

2. The method of claim 1 wherein said reference temperature is from about 500 degrees C. to about 650 degrees C.

3. The method of claim 1 further comprising storing said electrical energy.

4. The method of claim 1 wherein said distributing a stream of exhaust gases through said catalytic converter comprises providing a main exhaust flow pathway in fluid communication with said first exhaust flow pathway and said second exhaust flow pathway and providing said catalytic converter in said main exhaust flow pathway.

5. The method of claim 4 further comprising converting thermal energy from said stream of exhaust gases into electrical energy after said distributing a stream of exhaust gases through said catalytic converter.

6. The method of claim 5 further comprising storing said electrical energy.

7. The method of claim 1 further comprising providing at least one thermoelectric energy recovery system in thermal contact with said catalytic converter and wherein said converting thermal energy from said stream of exhaust gases into electrical energy comprises operating said at least one thermoelectric energy recovery system when said measured temperature exceeds said reference temperature.

8. The method of claim 7 further comprising storing said electrical energy.

9. The method of claim 7 wherein said providing at least one thermoelectric energy recovery system in thermal contact with said catalytic converter comprises providing a pair of thermoelectric energy recovery systems in thermal contact with said catalytic converter, and wherein said catalytic converter is sandwiched between said pair of thermoelectric energy recovery systems.

10. An apparatus for controlling temperature of a catalytic converter in an automobile exhaust system, comprising:
    a thermoelectric energy recovery system for receiving a stream of exhaust gases;
    a catalytic converter provided in fluid communication with said thermoelectric energy recovery system;
    a controller operably connected to said thermoelectric energy recovery system for selectively operating said thermoelectric energy recovery system to convert thermal energy from the stream of exhaust gases into electrical energy; and
    an energy recovery system conduit and a bypass conduit bypassing said energy recovery system conduit, and wherein said thermoelectric energy recovery system is provided in said energy recovery system conduit.

11. The apparatus of claim 10 further comprising a battery operably connected to said thermoelectric recovery system for receiving and storing the electrical energy.

12. The apparatus of claim 10 further comprising an actuator plate carried by said energy recovery system conduit and said bypass conduit for selectively closing said energy recovery system conduit and said bypass conduit, and wherein said controller operably engages said actuator plate.

13. The apparatus of claim 10 further comprising a temperature sensor thermally engaging said catalytic converter for sensing a temperature of the catalytic converter and wherein said controller is operably connected to said temperature sensor for selectively operating said thermoelectric energy recovery system when a temperature of said catalytic converter exceeds a preset reference temperature.

14. The apparatus of claim 10 further comprising a second thermoelectric energy recovery system provided in fluid communication with said catalytic converter for converting thermal energy from the stream of exhaust gases into electrical energy after the stream of exhaust gases is distributed through said catalytic converter.

* * * * *